(12) United States Patent
Song et al.

(10) Patent No.: US 9,990,226 B2
(45) Date of Patent: Jun. 5, 2018

(54) APPARATUS AND METHOD FOR IMPLEMENTING COMMON PUBLIC RADIO INTERFACE NEGOTIATION STATE MACHINE

(71) Applicant: Huawei Technologies Co., Ltd., Shenzhen (CN)

(72) Inventors: Zheng Song, Shanghai (CN); Jian Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 14/673,443

(22) Filed: Mar. 30, 2015

(65) Prior Publication Data

US 2015/0304890 A1 Oct. 22, 2015

(30) Foreign Application Priority Data

Apr. 18, 2014 (CN) .......................... 2014 1 0156430

(51) Int. Cl.
*H04W 28/18* (2009.01)
*G06F 9/48* (2006.01)
(Continued)

(52) U.S. Cl.
CPC ................ *G06F 9/48* (2013.01); *H04L 69/12* (2013.01); *H04W 80/02* (2013.01); *H04W 92/12* (2013.01)

(58) Field of Classification Search
CPC ..... H04W 80/02; H04W 92/12; H04W 28/18; H04L 69/12
See application file for complete search history.

(56) References Cited

U.S. PATENT DOCUMENTS 9,341,676 B2\* 5/2016 Portolan ........ G01R 31/318572
2002/0029358 A1\* 3/2002 Pawlowski ......... G06F 11/0772
714/39
(Continued)

FOREIGN PATENT DOCUMENTS

CN 1625122 A 6/2005
CN 101221541 A 7/2008

OTHER PUBLICATIONS

"Common Public Radio Interface (CPRI); Interface Specification," CPRI Specification V6.0, Interface Specification, Aug. 30, 2013, 128 pages.

(Continued)

*Primary Examiner* — Edan Orgad
*Assistant Examiner* — Nourali Mansoury
(74) *Attorney, Agent, or Firm* — Conley Rose, P.C.

(57) ABSTRACT

An apparatus and a method for implementing a common public radio interface (CPRI) negotiation state machine. The apparatus includes an application-specific integrated circuit (ASIC) chip and a system on chip (SOC), where the ASIC chip is configured to send an interrupt request to the SOC in condition that n transition paths of m transition paths of the CPRI negotiation state machine need to be processed by the SOC; the SOC is configured to execute the software code according to the interrupt request to generate interrupt configuration information, and send the interrupt configuration information to the ASIC chip, where the interrupt configuration information is used to indicate whether the CPRI negotiation state machine transits to a state pointed by the n transition paths; and the ASIC chip is further configured to control transition of the CPRI negotiation state machine according to the interrupt configuration information.

11 Claims, 3 Drawing Sheets

(51) Int. Cl.
*H04W 80/02* (2009.01)
*H04L 29/06* (2006.01)
*H04W 92/12* (2009.01)

(56) References Cited

U.S. PATENT DOCUMENTS

| | | | | |
|---|---|---|---|---|
| 2009/0157936 A1* | 6/2009 | Goss | .................... | G06F 1/3203 |
| | | | | 710/264 |
| 2009/0248947 A1* | 10/2009 | Malwankar | ........... | G06F 13/404 |
| | | | | 710/316 |
| 2012/0319730 A1* | 12/2012 | Fitton | .................. | G06F 13/385 |
| | | | | 326/41 |
| 2013/0061237 A1* | 3/2013 | Zaarur | .................. | G06F 9/4856 |
| | | | | 718/105 |
| 2013/0232471 A1* | 9/2013 | Henties | ..................... | G06F 8/45 |
| | | | | 717/124 |
| 2013/0339565 A1* | 12/2013 | Veal | .................... | G06F 13/4027 |
| | | | | 710/306 |
| 2013/0346799 A1* | 12/2013 | Warren | ................. | G06F 11/263 |
| | | | | 714/28 |
| 2014/0079037 A1* | 3/2014 | Evans | ................. | H04W 88/085 |
| | | | | 370/336 |

OTHER PUBLICATIONS

Wang, Y., et al., "CPRI Protocol Based FPGA High-speed Data Transmission Module Design and Implementation," China Academic Journal Electronic Publishing House, 2013, p. 36-45.
Foreign Communication From a Counterpart Application, Chinese Application No. 201410156430.2, Chinese Search Report dated Jul. 22, 2016, 2 pages.
Foreign Communication From a Counterpart Application, Chinese Application No. 201410156430.2, Chinese Office Action dated Aug. 1, 2016, 3 pages.

* cited by examiner

APPARATUS AND METHOD FOR IMPLEMENTING COMMON PUBLIC RADIO INTERFACE NEGOTIATION STATE MACHINE

CROSS-REFERENCE TO RELATED APPLICATIONS

This application claims priority to Chinese Patent Application No. 201410156430.2, filed on Apr. 18, 2014, which is hereby incorporated by reference in its entirety.

TECHNICAL FIELD

The present invention relates to the field of communications, and in particular, to an apparatus and a method for implementing a common public radio interface (CPRI) negotiation state machine.

BACKGROUND

Nowadays, a communications architecture in the communications industry is basically established according to seven layers of communications protocols of an Open System Interconnection (OSI) model. The seven-layer of communications protocols are: a physical layer, a link layer, a network layer, a transport layer, a session layer, a presentation layer, and an application layer.

The CPRI protocol is a data transmission protocol applied at the link layer. Further, the CPRI protocol is formulated by communications equipment manufacturers and is a standard of an interface between a radio equipment controller (REC) and radio equipment (RE) that are in a radio base station. The CPRI protocol mainly includes three aspects: the 8b10b encoding and decoding protocol that is used to discover a link transmission error, and a scrambling and descrambling solution that is used to ensure a good signal randomness; the High-level Data Link Control (HDLC) protocol and the Ethernet (ETH) protocol that are used to establish a connection network at the network layer; and a control word format solution for control information required for link synchronization and link maintenance.

In order to ensure correct transmission of a signal between an REC and an RE, it is necessary to ensure that the foregoing three aspects of the REC and the RE are in a good operation state. A CPRI negotiation state machine can reflect whether the foregoing three aspects are in a good operation state. Further, the CPRI negotiation state machine is disposed on both the REC and the RE. Before data transmission is performed between the REC and the RE, the CPRI negotiation state machine of the REC may negotiate with the CPRI negotiation state machine of the RE, and the data transmission between the REC and the RE starts only after it is confirmed that the foregoing three aspects are in a normal state.

In the existing CPRI protocol, a negotiation process between the CPRI negotiation state machine of the REC and the CPRI negotiation state machine of the RE mainly includes L1 layer (physical layer) synchronization negotiation, CPRI protocol version number negotiation, and HDLC capability and ETH capability negotiation. After the CPRI negotiation state machine of the REC and the CPRI negotiation state machine of the RE reach an agreement on the foregoing three aspects through negotiation, they transit to a same normal working state. In this case, the data transmission between the REC and the RE starts. During the data transmission between the REC and the RE, periodic negotiation is performed between the CPRI negotiation state machine of the REC and the CPRI negotiation state machine of the RE. Once states of the two state machines are inconsistent, the data transmission between the REC and the RE stops. It can be seen that, the CPRI negotiation state machines can ensure correct transmission of a signal between the REC and the RE.

At present, a CPRI negotiation state machine is implemented mainly by a hardware product, such as a chip. It is difficult to determine an evolution or change trend of the CPRI protocol, so CPRI protocols that can be supported by manufactured hardware products are very limited. After the CPRI protocol evolves or changes, an existing hardware product cannot be compatible with the latest CPRI protocol. The evolution of the existing CPRI protocol speeds up, which results in that the service life of the existing hardware product is greatly shortened and production costs of manufacturers are increased.

SUMMARY

Embodiments of the present invention provide an apparatus and a method for implementing a CPRI negotiation state machine, which can be compatible with a changed CPRI protocol.

A first aspect provides an apparatus for implementing a CPRI negotiation state machine, including an application-specific integrated circuit (ASIC) chip and a system on chip (SOC), where the SOC is loaded with rewritable software code; the ASIC chip is configured to send an interrupt request to the SOC in condition that n transition paths of m transition paths of the CPRI negotiation state machine need to be processed by the SOC, where m is a positive integer, and n is a positive integer less than or equal to m; the SOC is configured to execute the software code according to the interrupt request to generate interrupt configuration information, and send the interrupt configuration information to the ASIC chip, where the interrupt configuration information is used to indicate whether the CPRI negotiation state machine transits to a state pointed by the n transition paths; and the ASIC chip is further configured to control transition of the CPRI negotiation state machine according to the interrupt configuration information.

With reference to the first aspect, in a first possible implementation manner, the ASIC chip is provided with m sub-switches, and the m sub-switches are in a one-to-one correspondence to the m transition paths; and the ASIC chip is configured to send the interrupt request to the SOC in condition that n sub-switches of the m sub-switches are turned on, where the n sub-switches are in a one-to-one correspondence to the n transition paths.

With reference to the first possible implementation manner of the first aspect, in a second possible implementation manner, the ASIC chip is further provided with a software-based main switch, where turn-on of the n sub-switches is effective in condition that the software-based main switch is turned on.

With reference to the first aspect or any one of the foregoing implementation manners, in a third possible implementation manner, the SOC is configured to determine the n transition paths according to the interrupt request; acquire first negotiation information of the CPRI negotiation state machine from the ASIC chip, where the first negotiation information corresponds to the n transition paths; and execute the software code to generate the interrupt configuration information according to the first negotiation information.

With reference to the third possible implementation manner of the first aspect, in a fourth possible implementation manner, the first negotiation information includes at least one of the following: L1 layer synchronization information, CPRI protocol version information, HDLC capability information, ETH capability information, and L1 layer fault information.

With reference to the first aspect or any one of the foregoing implementation manners, in a fifth possible implementation manner, in condition that n is less than m, the ASIC chip is further configured to acquire second negotiation information of the CPRI negotiation state machine, where the second negotiation information is used to determine whether the CPRI negotiation state machine transits to a state pointed by one or more other transition paths, and the one or more other transition paths are one or more paths, other than the n transition paths, of the m transition paths; and the ASIC chip is configured to control transition of the CPRI negotiation state machine according to the second negotiation information and the interrupt configuration information.

With reference to the fifth possible implementation manner of the first aspect, in a sixth possible implementation manner, the second negotiation information includes at least one of the following: L1 layer synchronization information, CPRI protocol version information, HDLC capability information, ETH capability information, and L1 layer fault information.

With reference to the first aspect or any one of the foregoing implementation manners, in a seventh possible implementation manner, the ASIC chip is further configured to receive third negotiation information from a peer apparatus that is capable of performing data transmission with the apparatus; the SOC is further configured to execute the software code according to the interrupt request, so as to modify, in condition that it is determined that the third negotiation information does not match fourth negotiation information of the CPRI negotiation state machine, the fourth negotiation information to obtain fifth negotiation information, and send the fifth negotiation information and control information to the ASIC chip, where the control information is used to instruct the ASIC chip to send the fifth negotiation information to the peer apparatus, and the fifth negotiation information matches the third negotiation information; and the ASIC chip is further configured to send the fifth negotiation information to the peer apparatus according to the control information.

With reference to the seventh possible implementation manner of the first aspect, in an eighth possible implementation manner, information types of the third negotiation information, the fourth negotiation information, and the fifth negotiation information are the same; and the third negotiation information, the fourth negotiation information, and the fifth negotiation information all include at least one of the following: CPRI protocol version information, HDLC capability information, and ETH capability information.

A second aspect provides a method for implementing a CPRI negotiation state machine, where the method is executed by an apparatus for implementing the CPRI negotiation state machine, the apparatus includes an ASIC chip and a SOC, where the SOC is loaded with rewritable software code, and the method includes sending, by the ASIC chip, an interrupt request to the SOC in condition that n transition paths of m transition paths of the CPRI negotiation state machine need to be processed by the SOC, where m is a positive integer, and n is a positive integer less than or equal to m; executing, by the SOC, the software code according to the interrupt request to generate interrupt configuration information, and sending the interrupt configuration information to the ASIC chip, where the interrupt configuration information is used to indicate whether the CPRI negotiation state machine transits to a state pointed by the n transition paths; and controlling, by the ASIC chip, transition of the CPRI negotiation state machine according to the interrupt configuration information.

With reference to the second aspect, in a first possible implementation manner, the ASIC chip is provided with m sub-switches, where the m sub-switches are in a one-to-one correspondence to the m transition paths; and the sending, by the ASIC chip, an interrupt request to the SOC in condition that n transition paths of m transition paths of the CPRI negotiation state machine need to be processed by the SOC, includes sending, by the ASIC chip, the interrupt request to the SOC in condition that n sub-switches of m sub-switches are turned on, where the n sub-switches are in a one-to-one correspondence to the n transition paths.

With reference to the second aspect or the first possible implementation manner of the second aspect, in a second possible implementation manner, the executing, by the SOC, the software code according to the interrupt request to generate interrupt configuration information includes determining, by the SOC, the n transition paths according to the interrupt request; acquiring, by the SOC, first negotiation information of the CPRI negotiation state machine from the ASIC chip, where the first negotiation information corresponds to the n transition paths; and executing, by the SOC, the software code to generate the interrupt configuration information according to the first negotiation information.

With reference to the second possible implementation manner of the second aspect, in a third possible implementation manner, the first negotiation information includes at least one of the following: L1 layer synchronization information, CPRI protocol version information, HDLC capability information, ETH capability information, and L1 layer fault information.

With reference to the second aspect or any one of the foregoing implementation manners, in a fourth possible implementation manner, the method further includes acquiring, by the ASIC chip, second negotiation information of the CPRI negotiation state machine in condition that n is less than m, where the second negotiation information is used to determine whether the CPRI negotiation state machine transits to a state pointed by one or more other transition paths, and the one or more other transition paths are one or more paths, other than the n transition paths, of the m transition paths; and the controlling, by the ASIC chip, transition of the CPRI negotiation state machine according to the interrupt configuration information includes controlling, by the ASIC chip, the transition of the CPRI negotiation state machine according to the second negotiation information and the interrupt configuration information.

With reference to the fourth possible implementation manner of the second aspect, in a fifth possible implementation manner, the second negotiation information includes at least one of the following: L1 layer synchronization information, CPRI protocol version information, HDLC capability information, ETH capability information, and L1 layer fault information.

With reference to the second aspect or any one of the foregoing implementation manners, in a sixth possible implementation manner, the method further includes receiving, by the ASIC chip, third negotiation information from a peer apparatus that is capable of performing data transmission with the apparatus; executing, by the SOC, the software code according to the interrupt request, so as to modify, in condition that it is determined that the third negotiation information does not match fourth negotiation information of the CPRI negotiation state machine, the fourth negotiation information to obtain fifth negotiation information, and sending the fifth negotiation information and control information to the ASIC chip, where the control information is used to instruct the ASIC chip to send the fifth negotiation information to the peer apparatus, and the fifth negotiation information matches the third negotiation information; and sending, by the ASIC chip, the fifth negotiation information to the peer apparatus according to the control information.

With reference to the sixth possible implementation manner of the second aspect, in a seventh possible implementation manner, information types of the third negotiation information, the fourth negotiation information, and the fifth negotiation information are the same; and the third negotiation information, the fourth negotiation information, and the fifth negotiation information all include at least one of the following: CPRI protocol version information, HDLC capability information, and ETH capability information.

In embodiments of the present invention, an ASIC chip sends an interrupt request to an SOC, and the SOC executes rewritable software code according to the interrupt request to generate interrupt configuration information, where the interrupt configuration information is used to indicate whether a CPRI negotiation state machine transits to a state pointed by n transition paths, so that not all transition paths of the CPRI negotiation state machine are processed by hardware logic, but the ASIC chip controls transition of the CPRI negotiation state machine according to the interrupt configuration information. Therefore, compatibility with a changed CPRI protocol can be achieved based on the ability to rewrite software code.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

In the embodiments of the present invention, an apparatus for implementing a CPRI negotiation state machine may be located in an REC of a radio base station, or may be located in an RE of the radio base station. A wireless base station may belong to various communications systems, such as: a Global System for Mobile Communications (GSM), a Code Division Multiple Access (CDMA) system, a Wideband Code Division Multiple Access (WCDMA), a general packet radio service (GPRS), a Long Term Evolution (LTE), and a Universal Mobile Telecommunication System (UMTS).

A wireless base station may be a base transceiver station (base station or BTS) in the GSM or CDMA, may also be a base station (NodeB) in the WCDMA, and may further be an evolved NodeB (eNB or e-NodeB) in the LTE, which is not limited in the present invention.

Figure 1:
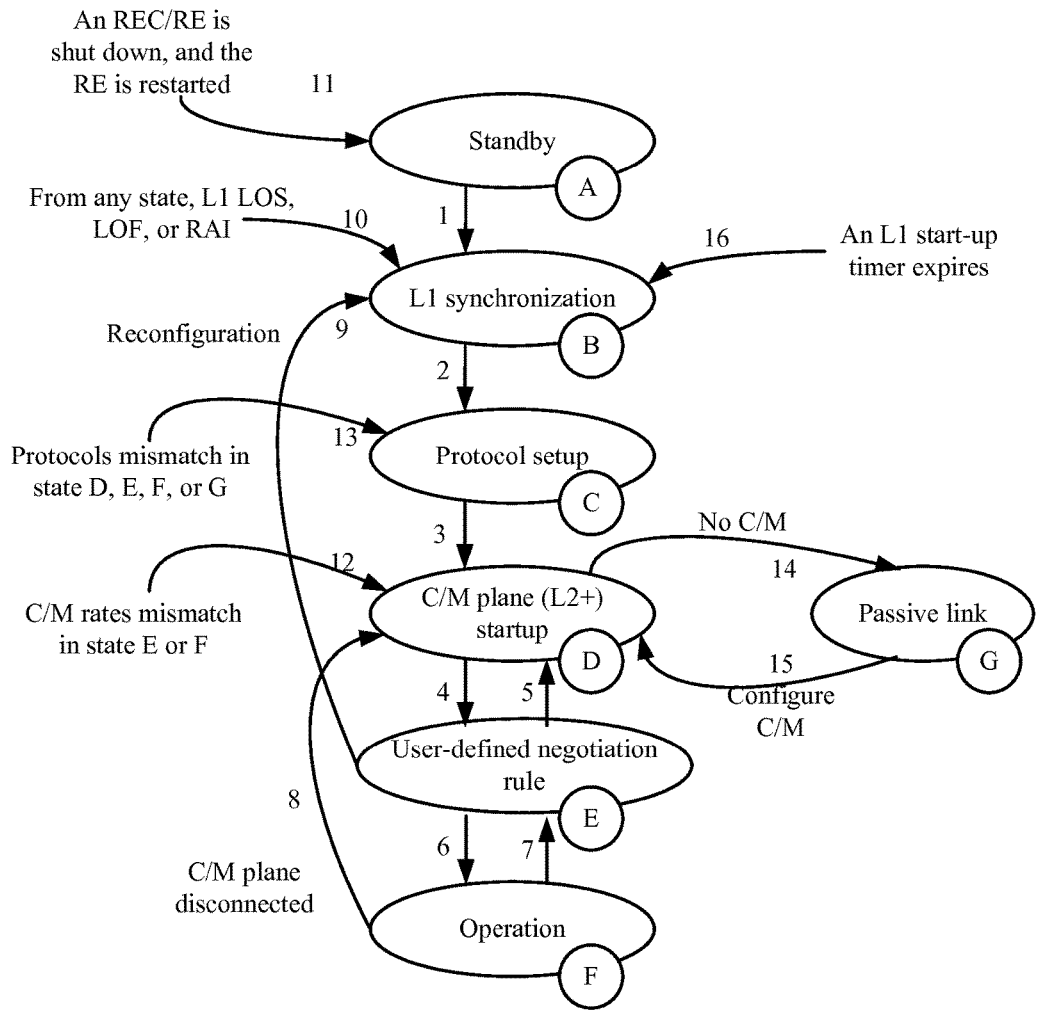
FIG. 1 is a topology diagram of a CPRI negotiation state machine based on the CPRI 6.0 protocol.

FIG. 1 is a topology diagram of a CPRI negotiation state machine based on the CPRI 6.0 protocol.

In FIG. 1, the CPRI negotiation state machine may be disposed in an REC or an RE. The CPRI negotiation state machine negotiates with another CPRI negotiation state machine. The other CPRI negotiation state machine may be disposed in the RE or the REC. Here, for ease of description, a device to which the CPRI negotiation state machine belongs is referred to as a first apparatus, and a device to which the other CPRI negotiation state machine belongs is referred to as a second apparatus. For example, when the first apparatus is the REC, the second apparatus may be the RE; when the first apparatus is the RE, the second apparatus may be the REC.

The CPRI negotiation state machine based on the CPRI 6.0 protocol may have 16 transition paths. The following describes the 16 transition paths of the CPRI negotiation state machine of the first apparatus. Initial states of CPRI negotiation state machines are state A.

Transition path 1: When the first apparatus is started, the CPRI negotiation state machine transits to state B.

Transition path 2: If clock synchronization between the first apparatus and the second apparatus succeeds, the CPRI negotiation state machine transits to state C.

When the CPRI negotiation state machine is in state C, the first apparatus and the second apparatus performs protocol setup.

Transition path 3: When CPRI protocol versions supported by the first apparatus and the second apparatus are consistent, the CPRI negotiation state machine transits from state C to state D.

When the CPRI negotiation state machine is in state D, control/management (C/M) planes of the first apparatus and the second apparatus start.

Transition path 4: When HDLC capabilities and ETH capabilities that are supported by the first apparatus and the second apparatus are consistent, the CPRI negotiation state machine transits from state D to state E.

Consistency of the HDLC capabilities and ETH capabilities may also be understood as that C/M rates match.

Transition path 5: When the CPRI negotiation state machine is in state E, if the HDLC capabilities and the ETH capabilities that are supported by the first apparatus and the second apparatus are inconsistent, the CPRI negotiation state machine transits from state E to state D.

For state E, a user may define some negotiation rules.

Transition path 6: When the first apparatus and the second apparatus meet the user-defined negotiation rules, the CPRI negotiation state machine transits from state E to state F.

When both the CPRI negotiation state machine and the other CPRI negotiation state machine transit to state F, the first apparatus and the second apparatus may operate normally, that is, they may start data transmission.

Transition path 7: During data transmission between the first apparatus and the second apparatus, if the first apparatus and the second apparatus do not meet the user-defined negotiation rules, the CPRI negotiation state machine transits from state F to state E.

Transition path 8: During data transmission between the first apparatus and the second apparatus, if a C/M plane connection between the first apparatus and the second apparatus is disconnected, the CPRI negotiation state machine transits from state F to state D.

Transition path 9: When the CPRI negotiation state machine is in state E, if the first apparatus or the second apparatus is reconfigured, the CPRI negotiation state machine transits from state E to state B.

Transition path 10: When the CPRI negotiation state machine is in any one state of state C to state G, if the first apparatus detects lost of signal (LOS) at an L1 layer, lost of frame (LOF) at an L1 layer, or a remote alarm indication (RAI), the CPRI negotiation state machine transits to state B.

Transition path 11: If the first apparatus is shut down or restarted, the CPRI negotiation state machine transits to state A.

Transition path 12: When the CPRI negotiation state machine is in state E or state F, if C/M rates of the first apparatus and the second apparatus do not match, the CPRI negotiation state machine transits to state D.

Transition path 13: When the CPRI negotiation state machine is in any one state of state D to state G, if CPRI protocol versions supported by the first apparatus and the second apparatus are inconsistent, the CPRI negotiation state machine transits to state C.

Transition path 14: If a link needed to be maintained at the C/M plane does not exist between the first apparatus and the second apparatus, the CPRI negotiation state machine transits to state G. When both the CPRI negotiation state machine and the other CPRI negotiation state machine transit to state G, the data transmission between the first apparatus and the second apparatus may also start. In this case, data may be transmitted through a passive link (Passive Link) between the first apparatus and the second apparatus.

Transition path 15: If the C/M plane is set between the first apparatus and the second apparatus, the CPRI negotiation state machine transits to state D.

Transition path 16: If an L1 layer start-up timer expires, the CPRI negotiation state machine transits to state B.

It can be seen that, correct transmission of a signal between two apparatuses may be ensured using a CPRI negotiation state machine. In an existing product, hardware logic controls transition of the CPRI negotiation state machine, that is, the determining of the foregoing 16 transition paths is implemented by the hardware logic. Because the hardware logic of the existing product cannot be changed, if a topology diagram of the CPRI negotiation state machine changes due to a CPRI protocol change, for example, an original transition path is split into two transition paths, or an original transition path is deleted, the product may not support the changed CPRI protocol. It should be noted that, the topology diagram of the CPRI negotiation state machine shown in FIG. 1 is generally not fixed, FIG. 1 is only an example, and a person skilled in the art may understand that various changes may exist in a state topology diagram of the state machine in actual application.

To flexibly adapt to a change in a transition state of a CPRI negotiation state machine, the following describes in detail the apparatus and the method for implementing a CPRI negotiation state machine in embodiments of the present invention.

Figure 2:
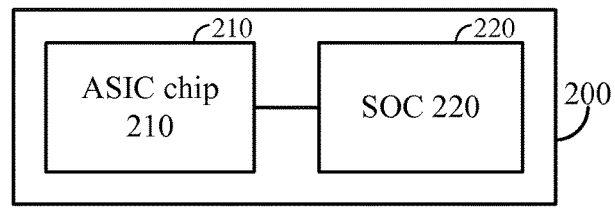
FIG. 2 is a schematic block diagram of an apparatus for implementing a CPRI negotiation state machine according to an embodiment of the present invention.

FIG. 2 is a schematic block diagram of an apparatus for implementing a CPRI negotiation state machine according to an embodiment of the present invention. The apparatus 200 in FIG. 2 may be located in an REC or an RE.

As shown in FIG. 2, the apparatus 200 includes an ASIC chip 210 and a SOC 220.

The SOC 220 is loaded with rewritable software code.

The ASIC chip 210 sends an interrupt request to the SOC in condition that n transition paths of m transition paths of the CPRI negotiation state machine need to be processed by the SOC 220, where m is a positive integer, and n is a positive integer less than or equal to m.

The SOC 220 executes the stored software code according to the first interrupt request to generate interrupt configuration information, and sends the interrupt configuration information to the ASIC chip 210, where the interrupt configuration information is used to indicate whether the CPRI negotiation state machine transits to a state pointed by the n transition paths. The software code may be stored in a memory (not shown in FIG. 2) of the apparatus 200, where the memory may be a non-volatile memory, or the memory may be located inside the SOC 220 and is integrated with a functional unit in the SOC 220 using integrated circuit technologies.

The ASIC chip 210 controls transition of the CPRI negotiation state machine according to the interrupt configuration information.

The CPRI negotiation state machine may have multiple transition paths, for example, in the existing CPRI 6.0 protocol, the CPRI negotiation state machine may have 16 transition paths. A transition path may also be understood as a transition condition. When a transition path meets a logical condition, the CPRI negotiation state machine transits to a state pointed by the transition path. Further, the ASIC chip 210 may control state transition of the CPRI negotiation state machine by generating control parameters of the state machine. These control parameters are used to change the state of the CPRI negotiation state machine.

In the existing hardware product for implementing the CPRI negotiation state machine, determining of the transition path of the CPRI negotiation state machine is fully implemented by hardware logic. As a result, when the CPRI protocol evolves or changes, the hardware logic in the existing hardware product cannot be changed to achieve compatibility with the latest CPRI protocol.

However, in the embodiment of the present invention, the ASIC chip sends the interrupt request to the SOC. The SOC may execute the rewritable software code to determine whether the CPRI negotiation state machine transits to a state pointed by the n transition paths, and then send the interrupt configuration information to the ASIC chip, and the ASIC chip controls transition of the CPRI negotiation state machine. It can be seen that, the transition paths of the CPRI negotiation state machine may be processed by the SOC using the rewritable software code. In this way, even though the CPRI protocol changes, the software code stored in the SOC may be modified to adapt to a changed transition path due to the CPRI protocol change, thereby achieving compatibility with the changed CPRI protocol. Therefore, the apparatus of the embodiment of the present invention has high flexibility and scalability.

In addition, different manufacturers may have different understandings on the CPRI protocol, so manufactured hardware products may also be different. As a result, the hardware products of different manufacturers cannot be interconnected. However, in the embodiment of the present invention, because the transition path can be processed by the SOC by executing the rewritable software code, the apparatus has scalability, which facilitates interconnection with another existing hardware product.

Therefore, in the embodiment of the present invention, an ASIC chip sends an interrupt request to an SOC, and the SOC executes rewritable software code according to the interrupt request to generate interrupt configuration information, where the interrupt configuration information is used to indicate whether a CPRI negotiation state machine transits to a state pointed by n transition paths, so that not all transition paths of the CPRI negotiation state machine are processed by hardware logic, but the ASIC chip controls transition of the CPRI negotiation state machine according to the interrupt configuration information. Therefore, compatibility with a changed CPRI protocol can be achieved based on the ability to rewrite software code.

In the embodiment of the present invention, the interrupt request may be sent by the ASIC chip periodically. A period of sending the interrupt request may be preconfigured. For example, the period of sending the interrupt request may be preconfigured to 0.2 milliseconds (ms).

Optionally, as an embodiment, the ASIC chip 210 is provided with m sub-switches, where the m sub-switches are in a one-to-one correspondence to the m transition paths.

The ASIC chip 210 may send the interrupt request to the SOC 220 in condition that n sub-switches of the m sub-switches are turned on.

In the embodiment of the present invention, "software-based" may be understood as "software". Because the SOC processes the transition path by executing the software code, the transition path processed by the SOC may be referred to as a software-based transition path, and the process may be referred to as software-based processing of a transition path.

Each transition path may have one corresponding sub-switch. In condition that a software-based main switch is turned on, if the sub-switch of a transition path is turned on, the transition path may be processed by the SOC 220. Each sub-switch may also be represented using a bit. For example, each sub-switch may use one bit to represent a turn-on or turn-off state of the sub-switch.

Professional operation staff may control the turn-on or turn-off of the software-based main switch and the sub-switches according to an actual situation. In condition that n sub-switches are turned on, the ASIC chip 210 may send an interrupt request to the SOC 220, and the SOC 220 processes n transition paths corresponding to the n sub-switches by executing software code. When a sub-switch is turned off, a transition path corresponding to the sub-switch is also closed, that is, related state transition cannot be performed.

In this embodiment, because sub-switches are independent of each other, a transition path to be processed by the SOC can be selected by turning on a switch, thereby achieving high flexibility and scalability.

Optionally, as another embodiment, the ASIC chip 210 may be further provided with a software-based main switch. Turn-on of the n sub-switches is effective in condition that the software-based main switch is turned on.

The turn-on and turn-off of the software-based main switch determine whether a transition path is processed using software code. In condition that the transition path does not need to be processed using the software code, the software-based main switch is turned off. In this way, the setting of the software-based main switch can prevent a mis-operation on the CPRI negotiation state machine. Further, the software-based main switch may be implemented using a switch code. The switch code may be represented using many bits, for example, the switch code may be set to 16 bits. If the software-based main switch is represented by simply using several bits, the software-based main switch may be incorrectly turned on due to a bit offset caused by an incorrect configuration or time sequence, and consequently, an error easily occurs in transition of the CPRI negotiation state machine. However, a 16-bit code can effectively avoid such a risk.

Optionally, as another embodiment, the SOC 220 may determine n transition paths according to the interrupt request, and acquire first negotiation information of the CPRI negotiation state machine from the ASIC chip 210, where the first negotiation information corresponds to the n transition paths. Then the SOC 220 may execute software code to generate the interrupt configuration information according to the first negotiation information.

After receiving the interrupt request from the ASIC chip 210, the SOC 220 may read information of the transition path from the ASIC chip 210, and determine the n transition paths to be processed. For example, in condition that the ASIC chip 210 is provided with sub-switches, the SOC 220 may read state information of the sub-switches from the ASIC chip, and determine n sub-switches to be turned on, thereby determining the n transition paths to be processed.

The SOC 220 may acquire the corresponding first negotiation information from the ASIC chip 210. Then, the SOC 220 may execute the software code to determine, according to the first negotiation information, whether the CPRI negotiation state machine transits to a state pointed by the n transition paths.

Optionally, as another embodiment, the first negotiation information may include at least one of the following: L1 layer synchronization information, CPRI protocol version information, HDLC capability information, ETH capability information, and L1 layer fault information.

Different transition paths may be determined according to different negotiation information. For example, a transition path for synchronization negotiation may be determined according to the L1 layer synchronization information; a transition path for version negotiation may be determined according to the CPRI protocol version information.

It should be understood that a negotiation procedure takes place between a CPRI negotiation state machine of the apparatus 200 and a CPRI negotiation state machine of a peer apparatus. For example, the apparatus 200 may be located in an REC, while the peer apparatus may be located in an RE. Or, the apparatus 200 may be located in an RE, while the peer apparatus may be located in an REC. Data transmission may be performed between the apparatus 200 and the peer apparatus. Therefore, the first negotiation information may include information of the apparatus 200 and information of the peer apparatus. For example, the L1 layer synchronization information may include L1 layer synchronization information of the apparatus 200 and L1 layer synchronization information of the peer apparatus; the CPRI protocol version information may include CPRI protocol version information of the apparatus 200 and CPRI protocol version information of the peer apparatus.

Optionally, as another embodiment, in condition that n is less than m, the ASIC chip 210 may acquire second negotiation information of the CPRI negotiation state machine, where the second negotiation information is used to determine whether the CPRI negotiation state machine transits to a state pointed by one or more other transition paths, and the one or more other transition paths are one or more paths, other than the n transition paths, of the m transition paths. The ASIC chip 210 may control transition of the CPRI negotiation state machine according to the second negotiation information and the interrupt configuration information.

Further, another transition path, other than a transition path to be processed by the SOC 220, of the m transition paths may still be processed by hardware logic of the ASIC chip 210. For example, when the CPRI protocol changes, perhaps only some transition paths change, while the rest transition paths do not change. Then, these changed transition paths may be processed by the SOC 220, while the rest unchanged transition paths may still be processed by the hardware logic of the ASIC chip 210.

The ASIC chip 210 may periodically acquire the second negotiation information, and determine, based on the second negotiation information, whether the CPRI negotiation state machine transits to a state pointed by one or more other transition paths. In this way, the ASIC chip 210 may control transition of the CPRI negotiation state machine according to the interrupt configuration information returned by the SOC 220 and the second negotiation information.

Optionally, as another embodiment, the second negotiation information may include at least one of the following: L1 layer synchronization information, CPRI protocol version information, HDLC capability information, ETH capability information, and L1 layer fault information.

For different transition paths, different negotiation information may be used for determining. For example, a transition path for synchronization negotiation may be determined according to the L1 layer synchronization information; a transition path for version negotiation may be determined according to the CPRI protocol version information.

As described above, the negotiation procedure takes place between the CPRI negotiation state machine of the apparatus 200 and the CPRI negotiation state machine of the peer apparatus. Data transmission may be performed between the apparatus 200 and the peer apparatus. Therefore, the second negotiation information may include information of the apparatus 200 and information of the peer apparatus. For example, the L1 layer synchronization information may include L1 layer synchronization information of the apparatus 200 and L1 layer synchronization information of the peer apparatus; the CPRI protocol version information may include CPRI protocol version information of the apparatus 200 and CPRI protocol version information of the peer apparatus.

Optionally, as another embodiment, the ASIC chip 210 may receive third negotiation information from the peer apparatus that is capable of performing data transmission with the apparatus 200.

The SOC 220 may also execute software code according to the interrupt request, so as to modify, in condition that it is determined that the third negotiation information does not match fourth negotiation information of the CPRI negotiation state machine of the apparatus 200, the fourth negotiation information to obtain fifth negotiation information, and send the fifth negotiation information and control information to the ASIC chip 210, where the control information is used to instruct the ASIC chip 210 to send the fifth negotiation information to the peer apparatus, and the fifth negotiation information matches the third negotiation information. That the fifth negotiation information matches the third negotiation information includes that the fifth negotiation information matches at least one parameter, such as a protocol version, included in the third negotiation information.

The ASIC chip 210 may send the fifth negotiation information to the peer apparatus according to the control information.

The peer apparatus may be a product that is different from the apparatus 200 in terms of CPRI protocol processing. For example, the peer apparatus may support the CPRI 6.0 protocol, and the apparatus 200 may support an evolved CPRI protocol based on the CPRI protocol 6.0. Then, the negotiation information of the CPRI negotiation state machine of the apparatus 200 may be inconsistent with that of the CPRI negotiation state machine of the peer apparatus. As a result, the CPRI negotiation state machines of both parties cannot transit to a next state. For the apparatus 200, the SOC 220 may modify the fourth negotiation information of the apparatus 200 to obtain the fifth negotiation information. The fifth negotiation information matches the third negotiation information of the peer apparatus. In this way, the SOC 220 may instruct the ASIC chip 210 to control the CPRI negotiation state machine to transit to a state pointed by a transition path corresponding to the fifth negotiation information.

However, in this case, when the CPRI negotiation state machine of the apparatus 200 transits, the CPRI negotiation state machine of the peer apparatus may not transit. Then, the SOC 220 may send the control information to the ASIC chip 210, where the control information may instruct the ASIC chip 210 to send the fifth negotiation information to the peer apparatus. In this way, the peer apparatus may determine that the fifth negotiation information matches the third negotiation information, so as to control the CPRI negotiation state machine of the peer apparatus to transit to a state pointed by the corresponding transition path.

It can be seen that, the SOC modifies mismatched negotiation information and instructs the ASIC chip to send modified negotiation information to the peer apparatus, so that both the CPRI negotiation state machine of the apparatus 200 and the CPRI negotiation state machine of the peer apparatus can transit to a same state, thereby achieving compatibility with a changed CPRI protocol.

As known from the foregoing description, the SOC has the following function: executing software code to modify the negotiation information and instruct the ASIC chip to send the modified negotiation information to the peer apparatus. In the embodiment of the present invention, because the SOC completes the function by executing the software code, the function may be referred to as a software-based sending function. Further, a switch may be set on the ASIC chip to control enabling or disabling of the function. For example, the switch may be referred to as a sending function switch. The switch may be implemented by a switch code. For example, the switch code may be set to 1 bit. When a value of the bit is "1", it indicates that the sending function is enabled, which means that the SOC may execute the software code to modify the negotiation information and instruct the ASIC chip to send the modified negotiation information to the peer apparatus. When a value of the bit is "0", it indicates that the sending function switch is turned off, which means that the SOC cannot modify the negotiation information, and in this case, the ASIC chip controls the sending of the negotiation information by itself. Generally, the turn-on or turn-off of the switch may be preconfigured by professional staff.

Optionally, as another embodiment, information types of the third negotiation information, the fourth negotiation information, and the fifth negotiation information are the same. The third negotiation information, the fourth negotiation information, and the fifth negotiation information may include at least one of the following: CPRI protocol version information, HDLC capability information, and ETH capability information.

For example, version information generally does not carry service information, and is only used as a parameter of the CPRI negotiation state machine in most cases. C/M rate information may include the HDLC capability information and the ETH capability information, and the C/M rate information carries link maintenance information.

If these pieces of information of the CPRI negotiation state machines in the apparatuses at both ends are inconsistent, the CPRI negotiation machine cannot perform negotiation successfully, and consequently, the apparatuses at both ends cannot transmit service data other than these pieces of information. Therefore, modifying the information by the SOC can enable the negotiation state machines to perform negotiation successfully. In this way, the apparatuses at both ends can transmit the service data other than the C/M rate information and the version information.

The foregoing describes an apparatus for implementing a CPRI negotiation state machine according to the embodiment of the present invention. The following details, with reference to specific examples, an implementation process of the apparatus according to an embodiment of the present invention. It should be noted that, the following examples are merely used to help a person skilled in the art to better understand the embodiment of the present invention, and is not intended to limit the scope of the embodiment of the present invention.

Figure 3:
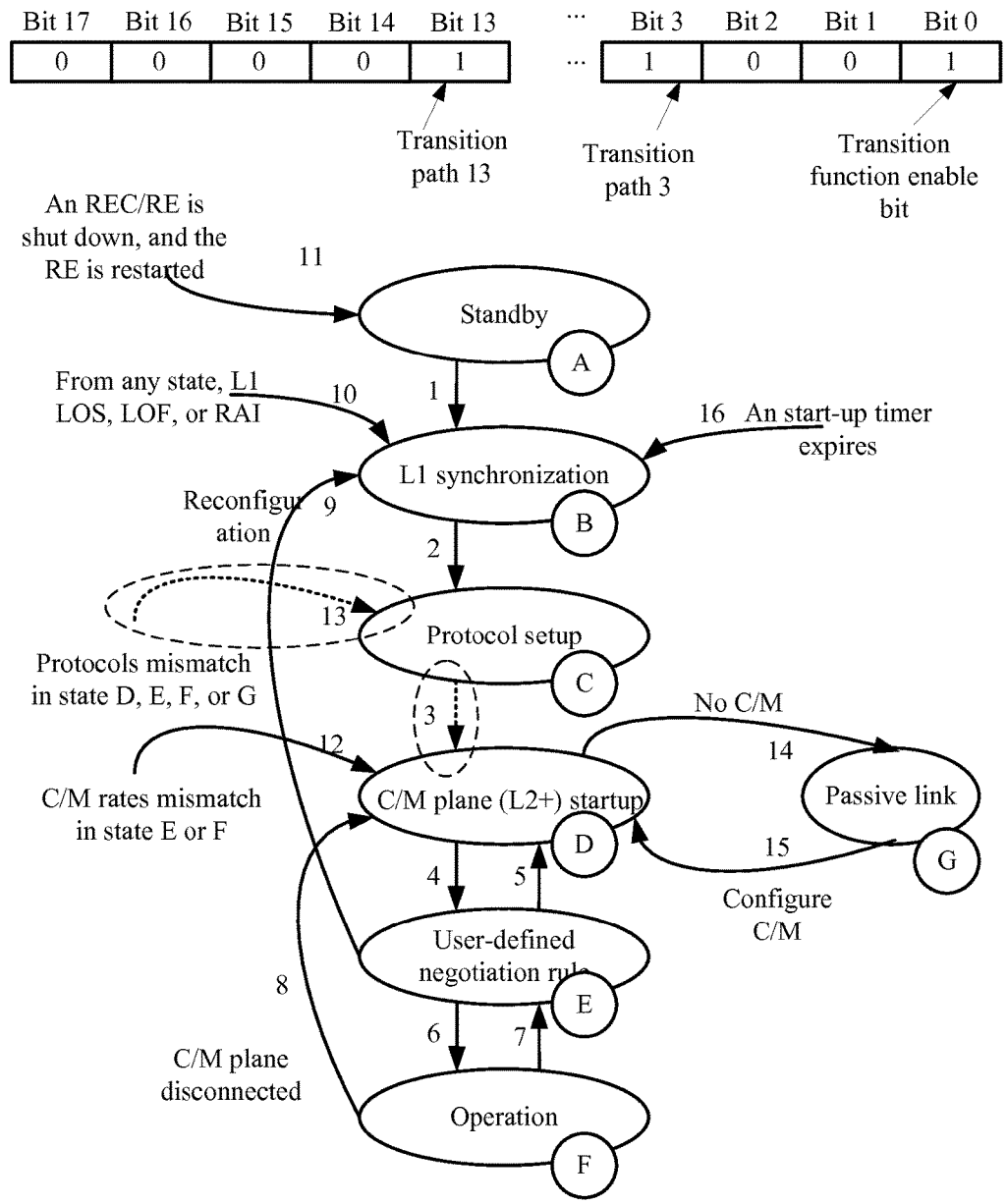
FIG. 3 is a topology diagram of a CPRI negotiation state machine implemented by an apparatus according to an embodiment of the present invention.

FIG. 3 is a topology diagram of a CPRI negotiation state machine implemented by an apparatus according to an embodiment of the present invention.

In FIG. 3, the CPRI 6.0 is still used as an example for description, with reference to FIG. 2. Before an apparatus 200 performs data transmission with a peer apparatus, a CPRI negotiation state machine of the apparatus 200 needs to negotiate with a CPRI negotiation state machine of the peer apparatus. The apparatus 200 may be an REC or an RE, and the peer apparatus may be an RE or an REC. For example, when the apparatus 200 is an REC, the peer apparatus may be an RE; when the apparatus 200 is an RE, the peer apparatus may be an REC.

A CPRI negotiation state machine based on the CPRI 6.0 protocol has 16 transition paths. Then, an ASIC chip 210 in the apparatus 200 may be provided with 16 sub-switches, and each sub-switch may be represented by one bit. The ASIC chip 210 may also be provided with a software-based main switch, where the software-based main switch may be represented by 16 bits.

As shown in the upper part of FIG. 3, the ASIC chip 210 is set with 18 bits, and bit 0 is a transition function enabling bit. Bit 1 to bit 16 correspond to 16 transition paths respectively, and bit 17 may be a reserved bit.

Further, as known from the foregoing description, in the embodiment of the present invention, an SOC may execute software code to process a transition path, and this function may be referred to as a software-based transition function. The SOC may also execute software code to modify negotiation information and control the ASIC chip to send modified negotiation information, and this function may be referred to as a software-based sending function. For each function, a corresponding switch code may be set. Here, bit 0 may be a switch code corresponding to the transition function. For example, when a value of bit 0 is "1", it indicates that the software-based transition function is enabled; when a value of bit 0 is "0", the software-based transition function is disabled, that is, the SOC does not process any transition path.

For another example, according to an actual requirement, the reserved bit 17 may be set to a switch code corresponding to the software-based sending function.

In addition, for each sub-switch, it is assumed that the sub-switch is turned off when a value of a bit is "0", and the sub-switch is turned on when a value of the bit is "1".

It is assumed that transition path 3 and transition path 13 need to be processed by an SOC 220; then, bit 3 corresponding to transition path 3 is set to "1", and bit 13 corresponding to transition path 13 is set to "1". Because other transition paths are still processed by hardware logic of the ASIC chip, values of bit 1, bit 2, bit 4 to bit 12, and bit 14 to bit 16 are "0". Turn-on or turn-off of a sub-switch may be set by professional operation personnel.

Initial states of the CPRI negotiation state machines of both the apparatus 200 and the peer apparatus are state A.

Transition path 1: When the apparatus 200 is started, the ASIC chip 210 controls the CPRI negotiation state machine of the apparatus 200 to transit to state B.

Transition path 2: The ASIC chip 210 determines, according to clock information of the apparatus 200 and clock information of the peer apparatus, whether a clock of the apparatus 200 is synchronized with a clock of the peer apparatus. If clock synchronization between the apparatus 200 and the peer apparatus succeeds, the ASIC chip 210 controls the CPRI negotiation state machine to transit to state C.

When the CPRI negotiation state machine is in state C, the apparatus 200 performs protocol negotiation (Protocol Setup) with the peer apparatus.

Because transition path 3 is processed by the SOC 220, the ASIC chip 210 may send an interrupt request to the SOC 220. The SOC 220 acquires, based on the interrupt request, protocol version information of the apparatus 200 and protocol version information of the peer apparatus from the ASIC chip 210. The SOC 220 may determine whether the CPRI protocol versions supported by the apparatus 200 and the peer apparatus are consistent, and generate interrupt configuration information. If the CPRI protocol versions supported by the apparatus 200 and the peer apparatus are consistent, the interrupt configuration information may be used to instruct the CPRI negotiation state machine to transit to state D. If the CPRI protocol versions supported by the apparatus 200 and the peer apparatus are inconsistent, the interrupt configuration information may be used to instruct the CPRI negotiation state machine to remain in state C. The SOC 220 may send the interrupt configuration information to the ASIC chip 210.

When the interrupt configuration information instructs the CPRI negotiation state machine to transit to state D, the ASIC chip 210 may control, according to the interrupt configuration information, the CPRI negotiation state machine to transit from state C to state D.

When the CPRI negotiation state machine is in state D, C/M planes of a first apparatus and a second apparatus start.

Transition path 4: The ASIC chip 210 determines, according to HDLC capability information and ETH capability information of the apparatus 200 and HDLC capability information and ETH capability information of the peer apparatus, whether HDLC capabilities and ETH capabilities that are supported by the apparatus 200 and the peer apparatus are consistent. When the HDLC capabilities and ETH capabilities that are supported by the apparatus 200 and the peer apparatus are consistent, the ASIC chip 210 controls the CPRI negotiation state machine to transit from state D to state E.

Consistency of the HDLC capabilities and ETH capabilities may also be understood as that C/M rates match.

Transition path 5: When the CPRI negotiation state machine is in state E, if the ASIC chip 210 determines that the HDLC capabilities and ETH capabilities that are supported by the apparatus 200 and the peer apparatus are inconsistent, the ASIC chip 210 controls the CPRI negotiation state machine to transit from state E to state D.

For state E, a user may define some negotiation rules.

Transition path 6: The ASIC chip 210 may determine whether the apparatus 200 and the peer apparatus meet the user-defined negotiation rules. When the apparatus 200 and the peer apparatus meet the user-defined negotiation rules, the ASIC chip 210 controls the CPRI negotiation state machine to transit from state E to state F.

When both the CPRI negotiation state machine of the apparatus 200 and the CPRI negotiation state machine of the peer apparatus transit to state F, the apparatus 200 and the peer apparatus may operate normally, that is, they may start data transmission.

Transition path 7: During data transmission between the apparatus 200 and the peer apparatus, if the ASIC chip 210 determines that the apparatus 200 and the peer apparatus do not meet the user-defined negotiation rules, the ASIC chip 210 controls the CPRI negotiation state machine to transit from state F to state E.

Transition path 8: During data transmission between the apparatus 200 and the peer apparatus, if the ASIC chip 210 determines that a C/M plane connection between the apparatus 200 and the peer apparatus is disconnected, the ASIC chip 210 controls the CPRI negotiation state machine to transit from state F to state D.

Transition path 9: When the CPRI negotiation state machine is in state E, if the ASIC chip 210 detects that the apparatus 200 or the peer apparatus is reconfigured, the ASIC chip 210 controls the CPRI negotiation state machine to transit from state E to state B.

Transition path 10: When the CPRI negotiation state machine is in any one state of state C to state G, if the ASIC chip 210 detects LOS at an L1 layer, LOF at an L1 layer, or RAI, the ASIC chip 210 controls the CPRI negotiation state machine to transit to state B.

Transition path 11: If the ASIC chip 210 detects that the apparatus 200 is shut down or restarted, the ASIC chip 210 controls the CPRI negotiation state machine to transit to state A.

Transition path 12: When the CPRI negotiation state machine is in state E or state F, if the ASIC chip 210 determines that the C/M rates of the apparatus 200 and the peer apparatus do not match, the ASIC chip 210 controls the CPRI negotiation state machine to transit to state D.

Transition path 13 is processed by the SOC 220, when the CPRI negotiation state machine is in any one state of state D to state G, the SOC 220 may acquire, based on the interrupt request of the ASIC chip 210, the protocol version information of the apparatus 200 and the protocol version information of the peer apparatus from the ASIC chip 210. The SOC 220 may determine whether the CPRI protocol versions supported by the apparatus 200 and the peer apparatus are consistent, and generate interrupt configuration information. If the CPRI protocol versions supported by the apparatus 200 and the peer apparatus are inconsistent, the interrupt configuration information may be used to instruct the CPRI negotiation state machine to transit to state C. If the CPRI protocol versions supported by the apparatus 200 and the peer apparatus are consistent, the interrupt configuration information may be used to instruct the CPRI negotiation state machine to remain in an original state. The SOC 220 may send the interrupt configuration information to the ASIC chip 210.

When the interrupt configuration information instructs the CPRI negotiation state machine to transit to state C, the ASIC chip 210 may control, according to the interrupt configuration information, the CPRI negotiation state machine to transit to state C.

Transition path 14: If the ASIC chip 210 determines that a link to be maintained at the C/M plane does not exist between the apparatus 200 and the peer apparatus, the ASIC chip 210 controls the CPRI negotiation state machine to transit to state G.

When both the CPRI negotiation state machine of the apparatus 200 and the CPRI negotiation state machine of the peer apparatus transit to state G, data transmission may start between the apparatus 200 and the peer apparatus. In this case, data may be transmitted through a passive link (Passive Link) between the apparatus 200 and the peer apparatus.

Transition path 15: If the ASIC chip 210 detects that the C/M plane is configured between the apparatus 200 and the peer apparatus, the ASIC chip 210 controls the CPRI negotiation state machine to transit from state G to state D.

Transition path 16: If the ASIC chip 210 determines an L1 layer start-up timer expires, the ASIC chip 210 controls the CPRI negotiation state machine to transit to state B.

In the embodiment of the present invention, an ASIC chip sends an interrupt request to an SOC, and the SOC executes rewritable software code according to the interrupt request to generate interrupt configuration information, where the interrupt configuration information is used to indicate whether a CPRI negotiation state machine transits to a state pointed by n transition paths, so that not all transition paths of the CPRI negotiation state machine are processed by hardware logic, but the ASIC chip controls transition of the CPRI negotiation state machine according to the interrupt configuration information. Therefore, compatibility with a changed CPRI protocol can be achieved based on the ability to rewrite software code.

Figure 4:
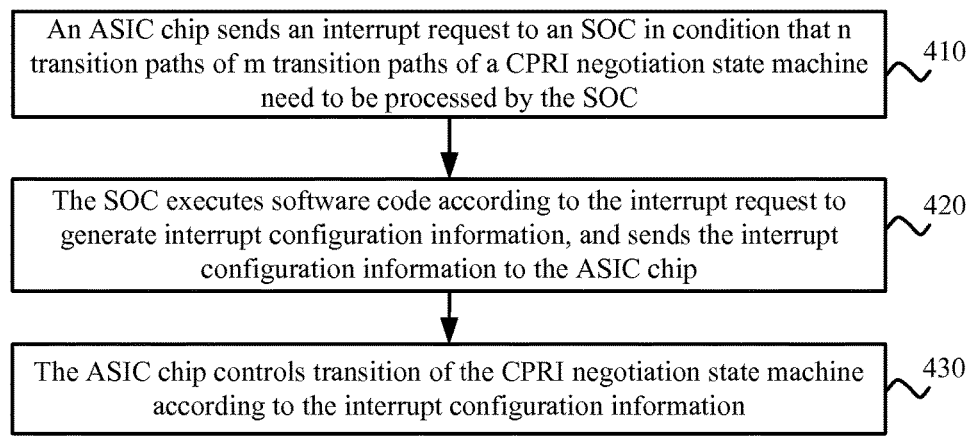
FIG. 4 is a method for implementing a CPRI negotiation state machine according to an embodiment of the present invention.

FIG. 4 is a method for implementing a CPRI negotiation state machine according to an embodiment of the present invention. The method in FIG. 4 is executed by an apparatus for implementing a CPRI negotiation state machine, such as the apparatus 200 shown in FIG. 2.

The apparatus for implementing a CPRI negotiation state machine may include an ASIC chip and an SOC, where the SOC is loaded with rewritable software code. 410. The ASIC chip sends an interrupt request to the SOC in condition that n transition paths of m transition paths of the CPRI negotiation state machine need to be processed by the SOC, where m is a positive integer, and n is a positive integer less than or equal to m.

420. The SOC executes software code according to the interrupt request to generate interrupt configuration information, and sends the interrupt configuration information to the ASIC chip, where the interrupt configuration information is used to indicate whether the CPRI negotiation state machine transits to a state pointed by the n transition paths.

430. The ASIC chip controls transition of the CPRI negotiation state machine according to the interrupt configuration information.

In the embodiment of the present invention, an ASIC chip sends an interrupt request to an SOC, and the SOC executes rewritable software code according to the interrupt request to generate interrupt configuration information, where the interrupt configuration information is used to indicate whether a CPRI negotiation state machine transits to a state pointed by n transition paths, so that not all transition paths of the CPRI negotiation state machine are processed by hardware logic, but the ASIC chip controls transition of the CPRI negotiation state machine according to the interrupt configuration information. Therefore, compatibility with a changed CPRI protocol can be achieved based on the ability to rewrite software code.

Optionally, as an embodiment, the ASIC chip is provided with m sub-switches, where the m sub-switches are in a one-to-one correspondence to the m transition paths. In step 410, the ASIC chip may send an interrupt request to the SOC in condition that n sub-switches of the m sub-switches are turned on, where the n sub-switches are in a one-to-one correspondence to the n transition paths.

Optionally, as another embodiment, in step 420, the SOC may determine n transition paths according to the interrupt request. The SOC may acquire first negotiation information of the CPRI negotiation state machine from the ASIC chip, where the first negotiation information corresponds to the n transition paths. The SOC may execute software code to generate the interrupt configuration information according to the first negotiation information.

Optionally, as another embodiment, the first negotiation information may include at least one of the following: L1 layer synchronization information, CPRI protocol version information, HDLC capability information, ETH capability information, and L1 layer fault information.

Optionally, as another embodiment, in condition that n is less than m, the ASIC chip may also acquire second negotiation information of the CPRI negotiation state machine, where the second negotiation information is used to determine whether the CPRI negotiation state machine transits to a state pointed by one or more other transition paths, and the one or more other transition paths are one or more paths, other than the n transition paths, of the m transition paths.

In step 430, the ASIC chip may control transition of the CPRI negotiation state machine according to the second negotiation information and the interrupt configuration information.

Optionally, as another embodiment, the second negotiation information may include at least one of the following: L1 layer synchronization information, CPRI protocol version information, HDLC capability information, ETH capability information, and L1 layer fault information.

Optionally, as another embodiment, the ASIC chip may also receive third negotiation information from a peer apparatus that is capable of performing data transmission with the apparatus. The SOC may execute software code according to the interrupt request, so as to modify, in condition that it is determined that the third negotiation information does not match fourth negotiation information of the CPRI negotiation state machine, the fourth negotiation information to obtain fifth negotiation information, and send the fifth negotiation information and control information to the ASIC chip, where the control information is used to instruct the ASIC chip to send the fifth negotiation information to the peer apparatus, and the fifth negotiation information matches the third negotiation information. The ASIC chip may send the fifth negotiation information to the peer apparatus according to the control information.

Optionally, as another embodiment, information types of the third negotiation information, the fourth negotiation information, and the fifth negotiation information are the same, and the third negotiation information, the fourth negotiation information, and the fifth negotiation information may include at least one of the following: CPRI protocol version information, HDLC capability information, and ETH capability information.

For a specific process in FIG. 4, reference may be made to functions and operations of the apparatus 200 in the embodiments of FIG. 2 and FIG. 3. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for implementing a common public radio interface (CPRI) negotiation state machine, the apparatus comprising:
   an application-specific integrated circuit (ASIC) chip; and
   a system on chip (SOC) coupled to the ASIC chip,
   wherein the SOC is loaded with rewritable software code,
   wherein the ASIC chip is configured to send an interrupt request to the SOC in condition that n transition paths of m transition paths of the CPRI negotiation state machine need to be processed by the SOC,
   wherein m is a positive integer,
   wherein n is a positive integer less than or equal to m,
   wherein the SOC is configured to:
      execute the software code according to the interrupt request to generate interrupt configuration information; and
      send the interrupt configuration information to the ASIC chip,
   wherein the interrupt configuration information indicates whether the CPRI negotiation state machine transits to a state pointed by the n transition paths,
   wherein the SOC is further configured to:
      determine the n transition paths according to the interrupt request;
      acquire first negotiation information of the CPRI negotiation state machine from the ASIC chip, wherein the first negotiation information corresponds to the n transition paths; and
      execute the software code to generate the interrupt configuration information according to the first negotiation information,
   wherein when n is less than m, the ASIC chip is further configured to acquire second negotiation information of the CPRI negotiation state machine,
   wherein the second negotiation information determines whether the CPRI negotiation state machine transits to a state pointed by one or more other transition paths,
   wherein the one or more other transition paths are one or more paths, other than the n transition paths, of the m transition paths,
   wherein the ASIC chip is further configured to:
      control transition of the CPRI negotiation state machine according to the second negotiation information and the interrupt configuration information; and
      receive third negotiation information from a peer apparatus that performs data transmission with the apparatus,
   wherein the SOC is further configured to:
      execute the software code according to the interrupt request to modify, in condition that it is determined that the third negotiation information does not match fourth negotiation information of the CPRI negotiation state machine, the fourth negotiation information to obtain fifth negotiation information; and
      send the fifth negotiation information and control information to the ASIC chip,
      wherein the control information instructs the ASIC chip to send the fifth negotiation information to the peer apparatus,
      wherein the fifth negotiation information matches the third negotiation information, and
      wherein the ASIC chip is further configured to send the fifth negotiation information to the peer apparatus according to the control information.

2. The apparatus according to claim 1, wherein the ASIC chip is provided with m sub-switches, wherein the m sub-switches are in a one-to-one correspondence to the m transition paths, wherein the ASIC chip is further configured to send the interrupt request to the SOC in condition that n sub-switches of the m sub-switches are turned on, and wherein the n sub-switches are in a one-to-one correspondence to the n transition paths.

3. The apparatus according to claim 2, wherein the ASIC chip is further provided with a software-based main switch, and wherein turn-on of the n sub-switches is effective in condition that the software-based main switch is turned on.

4. The apparatus according to claim 1, wherein the first negotiation information comprises at least one of the following: L1 (physical) layer synchronization information, CPRI protocol version information, High-Level Data Link Control (HDLC) capability information, Ethernet (ETH) capability information, and L1 layer fault information.

5. The apparatus according to claim 1, wherein the second negotiation information comprises at least one of the following: L1 layer synchronization information, CPRI protocol version information, HDLC capability information, ETH capability information, and L1 layer fault information.

6. The apparatus according to claim 1, wherein information types of the third negotiation information, the fourth negotiation information, and the fifth negotiation information are the same, and wherein the third negotiation information, the fourth negotiation information, and the fifth negotiation information all comprise at least one of the following: CPRI protocol version information, HDLC capability information, and ETH capability information.

7. A method for implementing a common public radio interface (CPRI) negotiation state machine, wherein the method is executed by an apparatus for implementing the CPRI negotiation state machine, wherein the apparatus comprises an application-specific integrated circuit (ASIC) chip and a system on chip (SOC), wherein the SOC is coupled to the ASIC chip, wherein the SOC is loaded with rewritable software code, and wherein the method comprises:
   sending, by the ASIC chip, an interrupt request to the SOC in condition that n transition paths of m transition paths of the CPRI negotiation state machine need to be processed by the SOC, wherein m is a positive integer, and wherein n is a positive integer less than or equal to m;
   executing, by the SOC, the software code according to the interrupt request to generate interrupt configuration information;
   sending, by the SOC, the interrupt configuration information to the ASIC chip, wherein the interrupt configuration information indicates whether the CPRI negotiation state machine transits to a state pointed by the n transition paths;
   controlling, by the ASIC chip, transition of the CPRI negotiation state machine according to the interrupt configuration information;

determining, by the SOC, the n transition paths according to the interrupt request;

acquiring, by the SOC, first negotiation information of the CPRI negotiation state machine from the ASIC chip, wherein the first negotiation information corresponds to the n transition paths;

executing, by the SOC, the software code to generate the interrupt configuration information according to the first negotiation information;

acquiring, by the ASIC chip, second negotiation information of the CPRI negotiation state machine when n is less than m, wherein the second negotiation information determines whether the CPRI negotiation state machine transits to a state pointed by one or more other transition paths, wherein the one or more other transition paths are one or more paths, other than the n transition paths, of the m transition paths, and wherein controlling, by the ASIC chip, the transition of the CPRI negotiation state machine according to the interrupt configuration information, comprises controlling, by the ASIC chip, the transition of the CPRI negotiation state machine according to the second negotiation information and the interrupt configuration information;

receiving, by the ASIC chip, third negotiation information from a peer apparatus that performs data transmission with the apparatus;

executing, by the SOC, the software code according to the interrupt request to modify, in condition that it is determined that the third negotiation information does not match fourth negotiation information of the CPRI negotiation state machine, the fourth negotiation information to obtain fifth negotiation information;

sending, by the SOC, the fifth negotiation information and control information to the ASIC chip, wherein the control information instructs the ASIC chip to send the fifth negotiation information to the peer apparatus, and wherein the fifth negotiation information matches the third negotiation information; and sending, by the ASIC chip, the fifth negotiation information to the peer apparatus according to the control information.

8. The method according to claim 7, wherein the ASIC chip is provided with m sub-switches, wherein the m sub-switches are in a one-to-one correspondence to the m transition paths, wherein sending, by the ASIC chip, the interrupt request to the SOC in condition that n transition paths of m transition paths of the CPRI negotiation state machine need to be processed by the SOC, comprises sending, by the ASIC chip, the interrupt request to the SOC in condition that n sub-switches of the m sub-switches are turned on, and wherein the n sub-switches are in a one-to-one correspondence to the n transition paths.

9. The method according to claim 7, wherein the first negotiation information comprises at least one of the following: L1 (physical) layer synchronization information, CPRI protocol version information, High-Level Data Link Control (HDLC) capability information, Ethernet (ETH) capability information, and L1 layer fault information.

10. The method according to claim 7, wherein the second negotiation information comprises at least one of the following: L1 layer synchronization information, CPRI protocol version information, HDLC capability information, ETH capability information, and L1 layer fault information.

11. The method according to claim 7, wherein information types of the third negotiation information, the fourth negotiation information, and the fifth negotiation information are the same, and wherein the third negotiation information, the fourth negotiation information, and the fifth negotiation information all comprise at least one of the following: CPRI protocol version information, HDLC capability information, and ETH capability information.

\* \* \* \* \*